(12) United States Patent
Lin

(10) Patent No.: US 6,818,834 B1
(45) Date of Patent: Nov. 16, 2004

(54) SUSPENDED TYPE CABLE FIXING-UP RACK

(75) Inventor: Kuan Lin Lin, Taipei (TW)

(73) Assignee: Hsing Chau Industrial Co., Ltd, Taipei (TW)

( * ) Notice: Subject to any disclaimer, the term of this patent is extended or adjusted under 35 U.S.C. 154(b) by 0 days.

(21) Appl. No.: 10/835,144

(22) Filed: Apr. 27, 2004

(51) Int. Cl.[7] .............................. A47F 5/00; G02B 6/00; F16L 3/00; H02G 3/00
(52) U.S. Cl. .................... 174/135; 174/68.3; 174/99 R; 211/26; 248/49; 248/65; 248/68.1; 248/74.3; 361/826; 379/328; 439/540.1; 439/719
(58) Field of Search ...................... 174/48, 68.1, 68.3, 174/99 R, 135; 211/26; 248/49, 57–59, 65, 68.1, 70, 73, 74.3, 909; 361/825, 826; 379/327, 328; 385/134, 135; 439/540.1, 719

(56) References Cited

U.S. PATENT DOCUMENTS

| | | | | |
|---|---|---|---|---|
| 5,918,837 A | * | 7/1999 | Vicain | 248/68.1 |
| 6,170,784 B1 | * | 1/2001 | MacDonald et al. | 248/74.3 |
| 6,215,064 B1 | * | 4/2001 | Noble et al. | 361/826 |
| 6,245,998 B1 | * | 6/2001 | Curry et al. | 174/72 A |
| 6,285,565 B1 | * | 9/2001 | .ANG.berg et al. | 361/826 |
| 6,373,721 B2 | * | 4/2002 | Lecinski et al. | 361/826 |
| 6,396,992 B1 | * | 5/2002 | Debal | 385/135 |
| 6,445,865 B1 | * | 9/2002 | Janus et al. | 385/134 |
| 6,590,785 B1 | * | 7/2003 | Lima et al. | 361/825 |
| 6,600,106 B2 | * | 7/2003 | Standish et al. | 174/68.3 |
| 6,679,722 B1 | * | 1/2004 | Pulizzi | 439/719 |
| 6,686,541 B2 | * | 2/2004 | Chan | 174/68.1 |
| 6,742,746 B1 | * | 6/2004 | La Scola et al. | 248/68.1 |

* cited by examiner

Primary Examiner—Dean A. Reichard
Assistant Examiner—Adolfo Nino

(57) ABSTRACT

A suspended type cable fixing-up rack adapted to mount on a frame includes a cable patch board for a plurality of cables to connect thereto, a cable support, and mounting elements. The cable patch board includes two side wings provided with mounting holes. Each of the mounting elements includes a first bent section having mounting holes provided at a flat head portion thereof, and a second bent section provided with retaining holes, into which hooks provided on two cantilever arms at two lateral ends of the cable support are extended. Whereby the cable patch board and the mounting elements are connected together and fixed to the frame by threading screws through mounting holes on the first bent sections of the mounting elements and the wings of the cable patch board against the frame. Weight of cables fallen on the cable support is therefore evenly distributed to the frame.

8 Claims, 5 Drawing Sheets

SUSPENDED TYPE CABLE FIXING-UP RACK

FIELD OF THE INVENTION

The present invention relates to a cable fixing-up rack, and more particularly to a suspended type cable fixing-up rack that allows weight of cables fallen on a cable support of the rack to be evenly distributed on a frame, to which the whole rack is connected, and therefore provides a strengthened cable supporting ability.

BACKGROUND OF THE INVENTION

With quick development of Internet and intranet systems in communities and office buildings, the setup in a network machine room has become more and more complicate than before. In a network machine room, there are out-going network lines provided by various Internet Service Providers (ISP), which may be, for example, 256 Kbyte, 512 Kbytes, T1, or T3 dedicated network lines. And then, cables must be arranged from the machine room to every family user in the community or every company in the office building, even to every room in each house or every desk in each company.

Generally, there is a cable patch board having complicate wiring being provided in a control center of each network system. The cable patch board is provided with more than several decades of network terminal sockets to provide connection of a large quantity of communication cables for general network system, and to distribute network resources for use at terminals. These large quantities of communication cables are apt to tangle with one another, which not only results in disorder of wiring, but also causes inconveniences in inspection and repair of the cables. FIG. 1 is a perspective view of a conventional suspended type cable fixing-up rack disclosed in U.S. Pat. No. 6,568,542 B1 enabling orderly arrangement and easy maintenance of large quantities of cables. As shown, the conventional suspended cable fixing-up rack includes a cable support 10, which has a plurality of paired through holes 12 formed thereon, and an engaging means 11 provided at each end of the cable support 10 for movably engaging with a hanging ear (not shown) provided at an end of a cantilever arm 20. The cantilever arm 20 is provided at another opposite end with a retaining hook (not shown) for fixing purpose. A mounting element 30 is pivotally connected at a groove (not shown) to the retaining hook of each cantilever arm 20, so that the cantilever arm 20 and the mounting element 30 are assembled together. The mounting element 30 is then locked to a cable patch board 40 by means of screws. In this manner, the cable support is connected via the cantilever arms 20 and the mounting elements 30 to one side of the cable patch board 40 having cables connected thereto. Finally, the cable patch board 40 is locked at two lateral wings to a frame (not shown). Multiple cable patch boards 40 may be locked to the frame from top to bottom, and cables connected to the cable patch boards 40 are orderly arranged and fixed to the cable supports 10. The orderly arranged and fixed cables facilitate easy maintenance, repair, or replacement of any cable in the future.

However, the above-described cable fixing-up rack has a structural strength only enough to support cables for a small-scales network system, because the cable support 10 is supported by the cantilever arms 20 and the mounting elements 30 while multiple layers of cables hung from the cable patch boards repeatedly press against the cable supports 10 below them. Too many cables will finally collapse the cable supports 10. For this reason, it is impossible to produce the cable support 10 and the cable patch board 40 with overly expanded sizes, so as to avoid collapse of the cable supports 10 by a large quantity of cables. It is therefore tried by the inventor to develop an improved suspended type cable fixing-up rack that allows weight of cables fallen on a cable support of the rack to be evenly distributed on a frame, to which the whole rack is connected, and therefore provides a strengthened cable supporting ability.

SUMMARY OF THE INVENTION

A primary object of the present invention is to provide a suspended type cable fixing-up rack that is adapted to mount on a frame and distribute weight of cables born by the rack to the frame, so as to provide strengthened ability of supporting a large quantity of cables.

To achieve the above and other objects, the suspended type cable fixing-up rack according to the present invention includes a cable patch board for a plurality of cables to connect thereto, a cable support, and a pair of mounting elements. The cable patch board is provided near two lateral ends with two screw holes, and includes two wings sideward extended from two outmost ends of the cable patch board and having mounting holes provided thereon. Each of the mounting elements includes at least two bent sections, a first one of which includes a flat head portion provided with mounting holes corresponding to the mounting holes on the wings of the cable patch board, and a second one of which includes retaining holes, into which hooks provided on two cantilever arms at two lateral ends of the cable support are extended, and a screw hole, which corresponds to the screw hole provided near each lateral end of the cable patch board. Whereby the cable patch board and the mounting elements may be fixed to the frame by threading screws through mounting holes on the first bent section of the mounting elements and the wings of the cable patch board against the frame. In this manner, weight of cables fallen on the cable support can be evenly distributed on the frame to strengthen the whole suspended type cable fixing-up rack.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
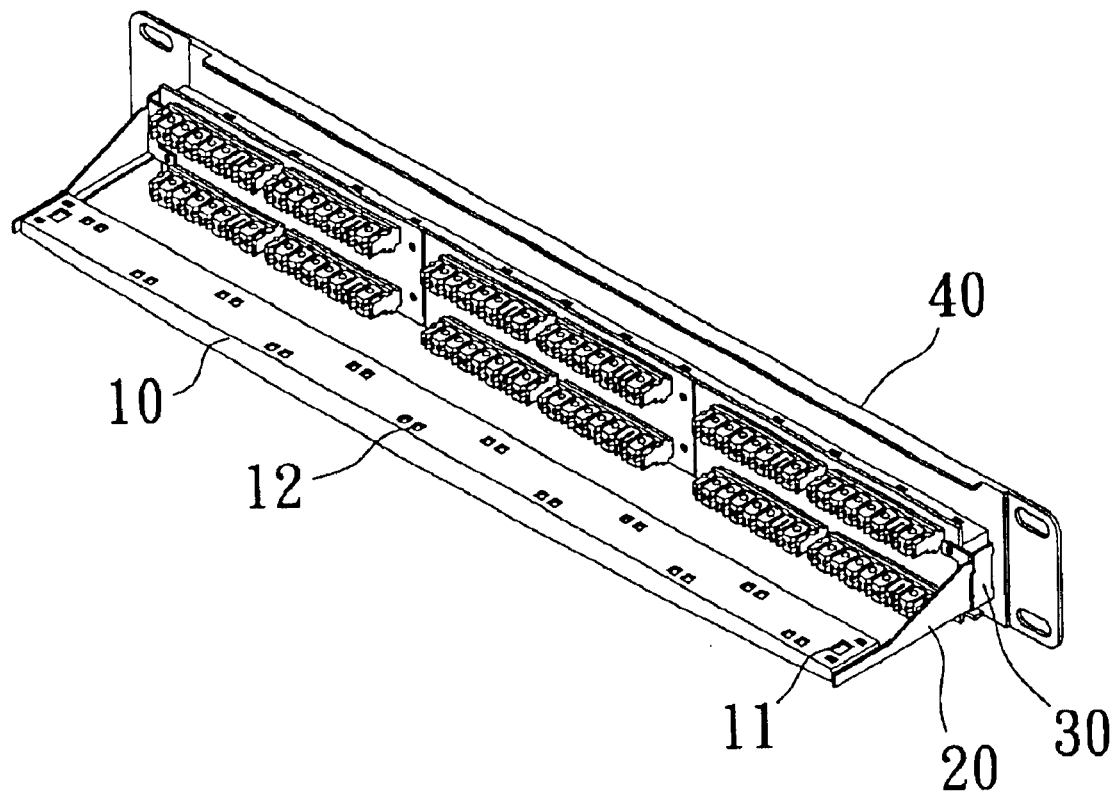
FIG. 1 is a perspective view of a conventional suspended type cable fixing-up rack.
Figure 2:
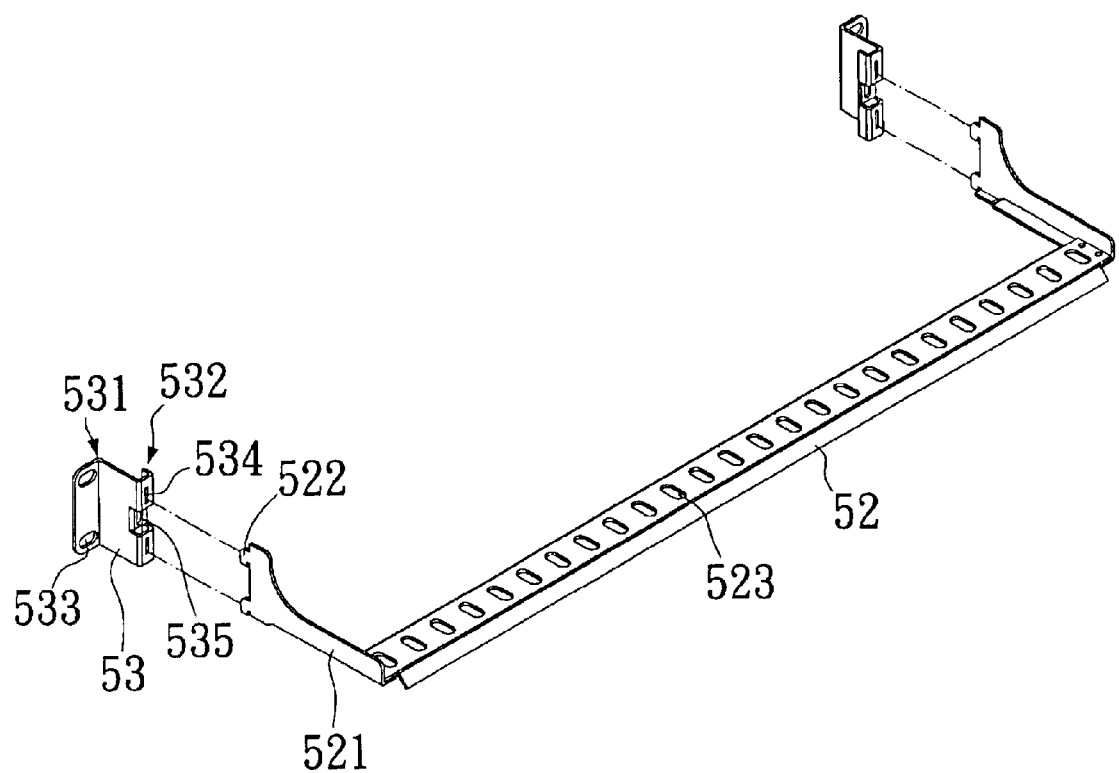
FIG. 2 shows a cable support and a mounting element of the suspended type cable fixing-up rack of the present invention in a disassembled state.
Figure 3:
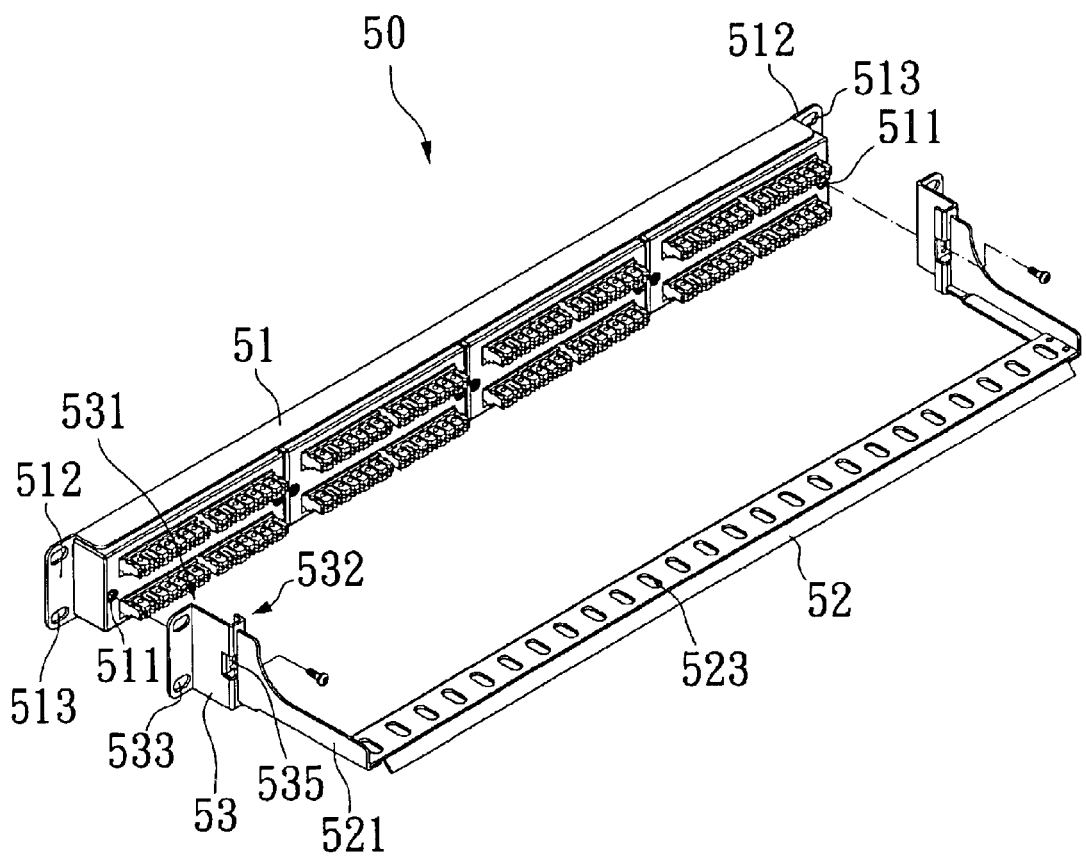
FIG. 3 is an exploded perspective view of the suspended type cable fixing-up rack of the present invention.

Please refer to FIG. 2 that shows a cable support 52 and a mounting element 53 for a suspended type cable fixing-up rack 50 according to the present invention in a disassembled state; and to FIG. 3 that is an exploded perspective view of the suspended type cable fixing-up rack 50 of the present invention.

Figure 4:
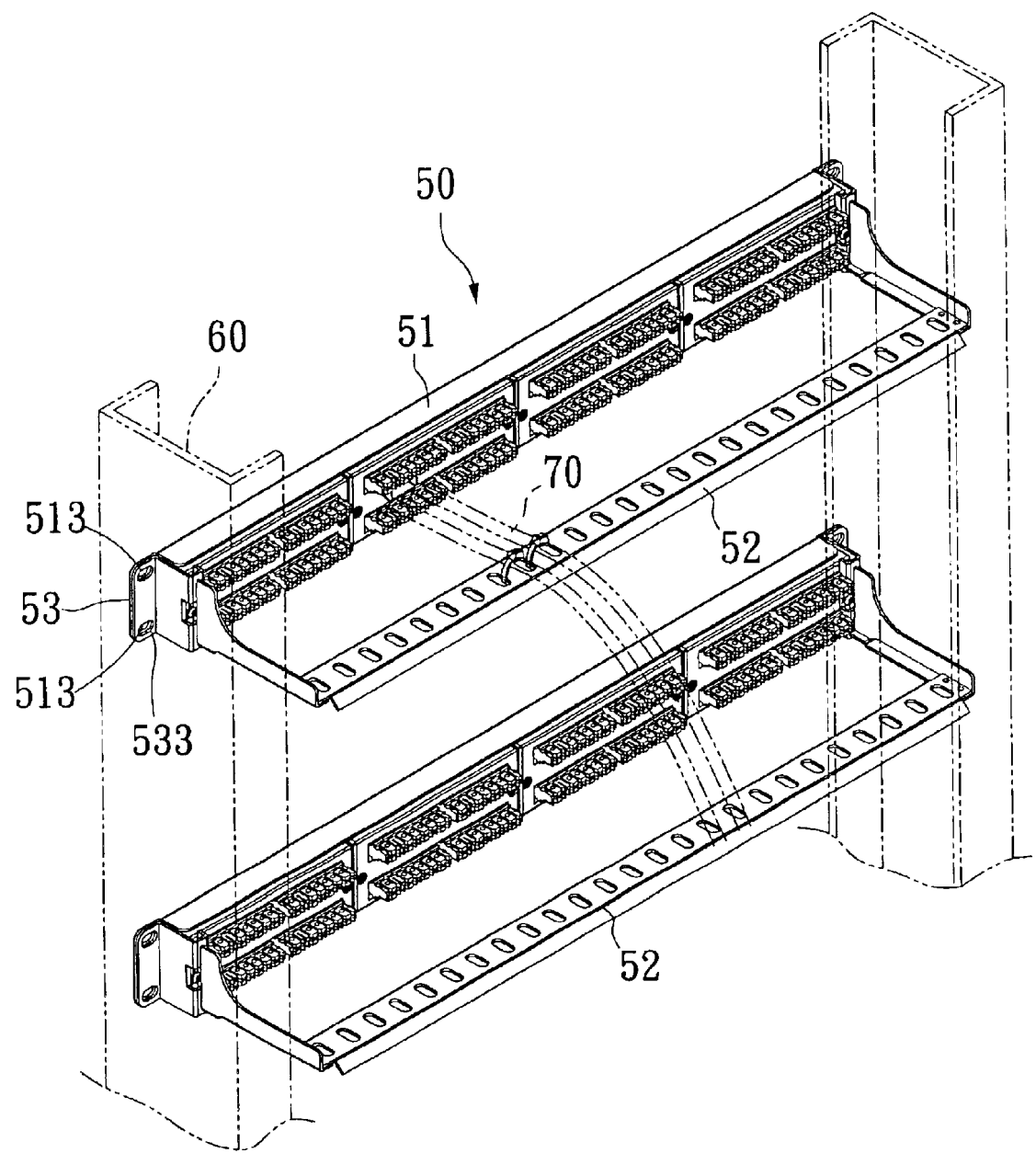
FIG. 4 is a perspective view showing a preferred example of implementation of the present invention.
Figure 5:
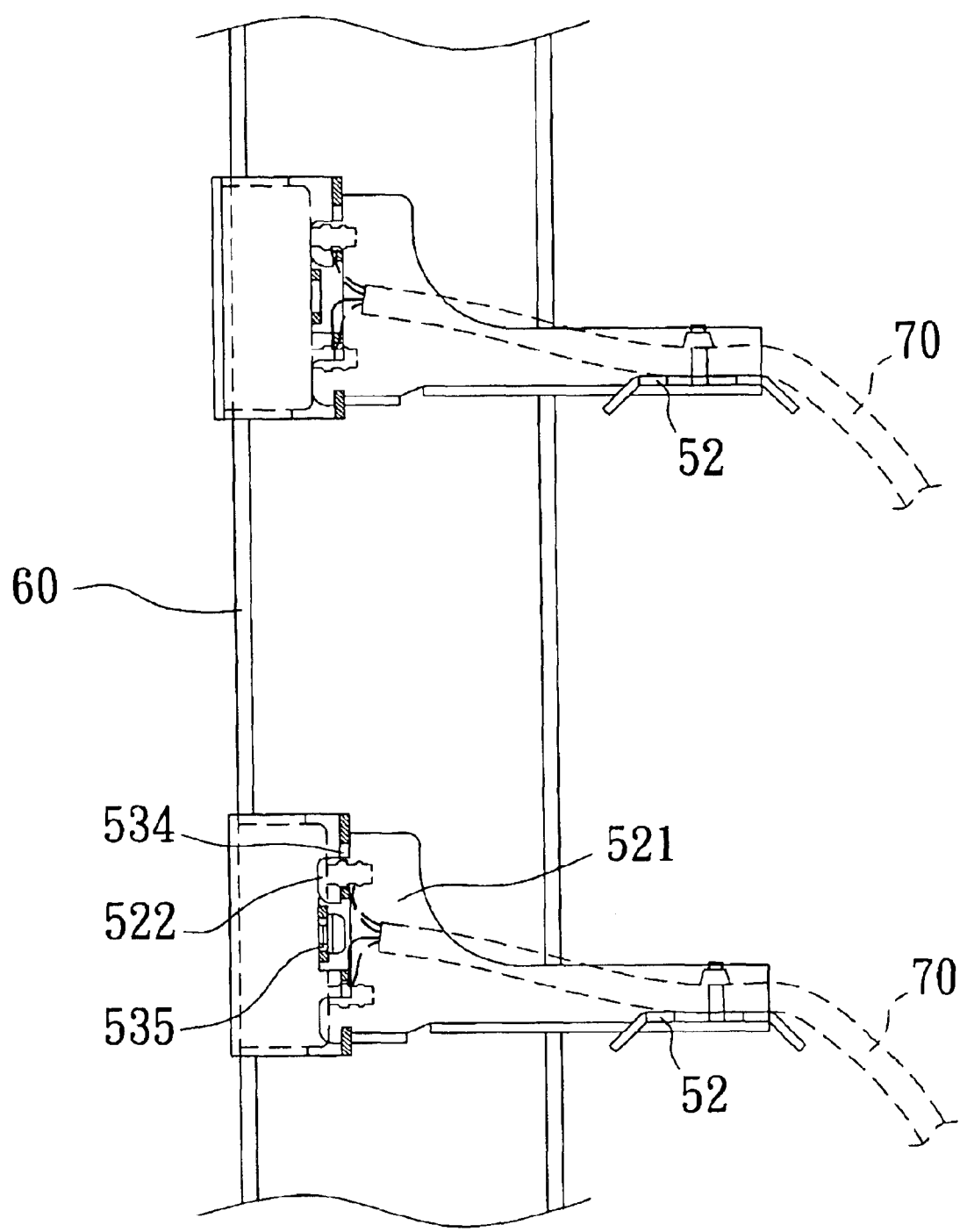
FIG. 5 is a sectioned side view of FIG. 4.

The suspended type cable fixing-up rack 50 of the present invention is adapted to mount on a frame 60, as shown in FIGS. 4 and 5, and mainly includes a cable patch board 51 to which a plurality of cable 70 are connected (see FIGS. 4 and 5), a cable support 52, and a pair of mounting elements 53.

The cable patch board 51 is provided near two lateral ends with screw holes 511, and includes two wings 512, which are sideward extended from two outmost ends of the cable patch board 51 and have mounting holes 513 provided thereon.

Each of the mounting elements 53 includes two integrally formed sections that are bent toward two opposite directions, a first one of which is L-shaped, which will be referred to as the L-shaped bent section 531 hereinafter, and the second section is substantially U-shaped, which will be referred to as the U-shaped bent section 532 hereinafter. The L-shaped bent section 531 includes a flat head portion provided with mounting holes 533 corresponding to the mounting holes 513 on the wings 512 of the cable patch board 51, and the U-shaped bent section 532 includes a flat face portion on which two retaining holes 534 and a screw hole 535 located between the retaining holes 534 are provided. The screw holes 535 are corresponding to the screw holes 511 near two lateral ends of the cable patch board 51.

The cable support 52 includes two rearward extended cantilever arms 521, on each rear end of which two hooks 522 are formed corresponding to the two retaining holes 534 on the mounting element 53. The cable support 52 is provided with a plurality of spaced through holes 523. Fixture or other fastening means, such as wires, may be provided at the through holes 523, so that a cable 70 passing over the cable support 52 may be fixed to a corresponding through hole 523 using the fixture or the fastening means.

Please refer to FIGS. 4 and 5 that are perspective and sectioned side views, respectively, of an example of implementation of the present invention. As shown, to connect the cable fixing-up rack 50 to the frame 60, first bear the flat head portion of the L-shaped bent section 531 of the mounting element 53 against the wing 512 of the cable patch board 51 with the mounting holes 533 aligned with the mounting holes 513, and then thread screws through the aligned mounting holes 533, 513 against the frame 60 to lock the cable patch board 51 and the mounting element 53 to the frame 60 at the same time. Thereafter, thread another screw through the screw hole 535 on the flat face portion of the U-shaped bent section 532 of the mounting element 53 and the screw hole 511 at each end of the cable patch board 51 (not shown in FIGS. 4 and 5). In this manner, any load from the cables 70 may be distributed to the frame 60. It is noted the U-shaped bent sections 532 of the mounting elements 53 are not necessarily tightened to the cable patch board 51 using screws and screw holes. For example, free ends of the U-shaped bent sections 532 of the mounting elements 53 may be otherwise spot welded to the cable patch board 51, provided there are not screw holes 511 formed on the cable patch board 51, to achieve the same well fixing effect. Finally, extend the hooks 522 on the two cantilever arms 521 of the cable support 52 into the retaining holes 534 on the U-shaped bent sections 532 of the mounting elements 53 to complete the connection of the suspended type cable fixing-up rack 50 to the frame 60 for use.

Several cable fixing-up racks 50 may be sequentially locked to the frame 60 from top to bottom. Cables 70 connected to the cable patch boards 51 may be orderly arranged corresponding to through holes 523 on the cable supports 52 and fixed thereto using the fixture or other fastening means provided at the through holes 523. With the cables 70 orderly arranged on the suspended type cable fixing-up racks 50, it would be easier in future maintenance, repair, or replacement of the cables 70. Moreover, the whole structural design of the suspended type cable fixing-up rack 50 of the present invention provides strengthened structure to support cables for big-scale network system. Since the cantilever arms 521, the mounting elements 53, and the frame 60 together provide supporting points to the cable supports 52, allowing the latter to sustain the weight of the cables 70 connected to and hung from the multiple vertically arranged cable patch boards 51, without becoming collapsed. That is, both the cable support 52 and the cable patch board 51 may be differently sized to satisfactorily meet the supporting requirements.

What is claimed is:

1. A suspended type cable fixing-up rack adapted to mount on a frame, comprising a cable patch board for a plurality of cables to connect thereto, a cable support, and a pair of mounting elements; said cable patch board being provided near two lateral ends with two screw holes, and including two wings sideward extended from two outmost ends of said cable patch board and having mounting holes provided thereon; said suspended type cable fixing-up rack being characterized in that each of said mounting elements includes at least two bent sections, a first one of which includes a flat head portion provided with mounting holes corresponding to said mounting holes on said wings of said cable patch board, and a second one of which includes retaining holes, into which hooks provided on two cantilever arms at two lateral ends of said cable support are extended, and a screw hole, which corresponds to said screw hole provided near each lateral end of said cable patch board, such that said cable patch board and said mounting elements may be fixed to said frame by threading fastening means through mounting holes on said first bent section of said mounting elements and said wings of said cable patch board against said frame.

2. The suspended type cable fixing-up rack as claimed in claim 1, wherein each of said mounting elements includes two said bent sections which are bent toward two opposite directions; said first bent section have an L-shaped cross section, and said second bent section have a U-shaped cross section.

3. The suspended type cable fixing-up rack as claimed in claim 2, wherein said U-shaped bent section includes a flat face portion, on which two said retaining holes are provided, and said screw hole is located between said two retaining holes.

4. The suspended type cable fixing-up rack as claimed in claim 1, wherein said cable support is provided with a plurality of spaced through holes, at each of which a fixture or other fastening means is provided, whereby a cable hung from said cable patch board and passing over said cable support is fixed to one of said through holes on said cable support by said fixture or said fastening means.

5. A suspended type cable fixing-up rack adapted to mount on a frame, comprising a cable patch board for a plurality of cables to connect thereto, a cable support, and a pair of mounting elements; said cable patch board including two wings sideward extended from two outmost ends of said cable patch board and having mounting holes provided thereon; said suspended type cable fixing-up rack being characterized in that each of said mounting elements includes at least two bent sections, a first one of which includes a flat head portion provided with mounting holes corresponding to said mounting holes on said wings of said cable patch board, and a second one of which includes retaining holes, into which hooks provided on two cantilever arms at two lateral ends of said cable support are extended, and is spot welded at predetermined point to said cable patch board; such that said cable patch board and said mounting elements may be fixed to said frame by threading fastening means through mounting holes on said first bent section of said mounting elements and said wings of said cable patch board against said frame.

6. The suspended type cable fixing-up rack as claimed in claim 5, wherein each of said mounting elements includes two said bent sections which are bent toward two opposite directions; said first bent section have an L-shaped cross section, and said second bent section have a U-shaped cross section.

7. The suspended type cable fixing-up rack as claimed in claim 6, wherein said U-shaped bent section includes a flat face portion, on which two said retaining holes are provided, and said U-shaped bent section being spot welded at a free edge to said cable patch board.

8. The suspended type cable fixing-up rack as claimed in claim 5, wherein said cable support is provided with a plurality of spaced through holes, at each of which a fixture or other fastening means is provided, whereby a cable hung from said cable patch board and passing over said cable support is fixed to one of said through holes on said cable support by said fixture or said fastening means.

* * * * *